United States Patent
Quine

(10) Patent No.: US 9,403,607 B2
(45) Date of Patent: Aug. 2, 2016

(54) SPACE ELEVATOR CAR MOUNTING METHOD

(71) Applicant: Brendan Mark Quine, Cookstown (CA)

(72) Inventor: Brendan Mark Quine, Cookstown (CA)

(73) Assignee: Thoth Technology, Inc., Pembroke, Ontario (CA)

( * ) Notice: Subject to any disclaimer, the term of this patent is extended or adjusted under 35 U.S.C. 154(b) by 0 days.

(21) Appl. No.: 14/703,945

(22) Filed: May 5, 2015

(65) Prior Publication Data

US 2015/0232206 A1  Aug. 20, 2015

Related U.S. Application Data

(62) Division of application No. 12/524,130, filed on Mar. 2, 2010.

(51) Int. Cl.
| | |
|---|---|
| *B64G 5/00* | (2006.01) |
| *B64G 1/00* | (2006.01) |
| *B66B 9/00* | (2006.01) |
| *E04B 1/18* | (2006.01) |
| *E04H 12/34* | (2006.01) |

(52) U.S. Cl.
CPC *B64G 5/00* (2013.01); *B64G 1/002* (2013.01); *B66B 9/00* (2013.01); *E04B 1/18* (2013.01); *E04H 12/342* (2013.01); *Y10T 29/49826* (2015.01)

(58) Field of Classification Search
CPC ............ B64G 5/00; B66B 7/044; B66B 9/02; B66B 9/027; B66B 2009/006; B66B 21/06
See application file for complete search history.

(56) References Cited

U.S. PATENT DOCUMENTS

| | | | | |
|---|---|---|---|---|
| 5,197,570 | A * | 3/1993 | Matsui | B66B 9/003 187/249 |
| 5,620,058 | A * | 4/1997 | Forrester | A62B 1/20 182/48 |
| 6,354,404 | B1 * | 3/2002 | Sansevero | B66B 9/02 187/249 |
| 7,530,532 | B2 * | 5/2009 | Watts | 244/171.3 |
| 8,602,168 | B2 * | 12/2013 | Tschuppert | B66B 9/00 187/249 |
| 2008/0001027 | A1 * | 1/2008 | Watts | 244/63 |

* cited by examiner

*Primary Examiner* — Brian M O'Hara

(57) ABSTRACT

A method of mounting cars on a free standing space elevator tower. The actively stabilized space elevator tower has a segmented elevator core structure, each segment being formed of at least one pneumatically pressurized cell. The method of mounting the elevator cars allows the cars to ascend or descend on the outer surface of the elevator core structure or in a shaft on the interior of the elevator core structure. The elevator cars grip the structure without use of a track and are able to pass other cars enabling bi-directional traffic flow using a twisting motion. The freestanding tower can be used for launch activities, tourism, observation, wind-energy generation, scientific research, and communications.

2 Claims, 1 Drawing Sheet

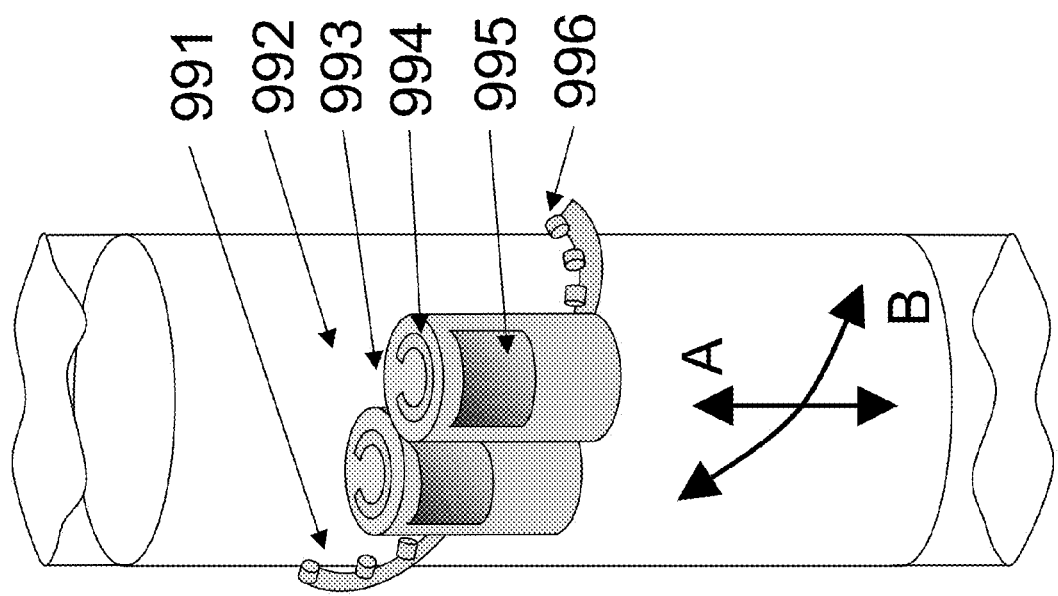

SPACE ELEVATOR CAR MOUNTING METHOD

FIELD

This invention relates to space elevators, and more particularly to a method of mounting elevator cars to a freestanding space elevator tower.

BACKGROUND

In order to access space or near space, payloads must gain significant potential and kinetic energy. Traditionally, regions above 50 km in altitude can only be accessed using rocketry, where mass is expelled at high velocity in order to achieve thrust in the opposite direction. This process is extremely inefficient as rockets must counter the gravitational force during the flight by carrying mass in the form of propellant and must overcome atmospheric drag. In contrast, if a payload is hauled to space or near space along an elevator system, the work done is significantly less as no expulsion mass must be carried to do work against gravity, and lower ascent speeds in the lower atmosphere can virtually eliminate atmospheric drag. Elevator cars' motion may also be powered remotely by electrical or inductive means, eliminating the need to carry any fuel.

It has previously been proposed, most famously by Arthur C. Clarke in his 1978 novel, *The Fountains of Paradise*, that a space elevator could be constructed using a cable and counter-balanced mass system. For Earth's gravity and spin rate, such a solution requires a cable of at least 35,000 km in length and a counter balance mass similar to a small asteroid. Such a system could be constructed by launching the cable into space or manufacturing it in situ and lowering it into contact with Earth. However, the technological obstacles that must be overcome, including the construction of a cable with suitable strength characteristics or the in-space construction of the apparatus, have not been realized since the concept was popularized by Clarke. Known materials are simply not strong enough to enable the construction of a cable of that length that would even be capable of supporting its own weight.

SUMMARY

The present invention is a method of mounting an elevator car to a self-supporting space elevator tower. The actively stabilized space elevator tower has a segmented elevator core structure, each segment being formed of at least one pneumatically pressurized cell. The method of mounting the elevator cars to the core structure allows the cars to ascend or descend on the outer surface of the elevator core structure or in a shaft on the interior of the elevator core structure. The elevator cars grip the structure without use of a track and are able to pass other cars enabling bi-directional traffic flow using a twisting motion.

The space tower can be used for the delivery of payloads to at least one platform or pod above the planetary surface for the purposes of space launch or for the recovery of a rocket stage. The space elevator tower may also be used to deliver equipment, personnel and other objects or people to at least one platform or pod above the surface of the Earth. While the described space elevator tower can provide access to lower altitude regions, the space elevator tower can also be scaled to access altitudes above, for example, 15 km, the typical ceiling altitude for commercial aviation. The space elevator tower can be further scaled to provide direct access to altitudes above 200 km and with the gravitation potential of Low Earth Orbit (LEO).

Although ascending to an altitude significantly below 35,000 km will not place a payload in Earth orbit, a platform or pod supported by the space elevator tower has significant advantages over a surface-based launch platform. While surface-based rockets must be designed to overcome atmospheric air resistance, launch from a high-altitude platform has no such requirement, and, consequently, existing space equipment such as an orbital transfer stage or conventional upper stage can be used to insert payloads directly into Earth orbit. Ideally, payloads should be raised to the highest feasible altitude before launching in order to maximize the energy advantages; however, the energy advantages for space flight are readily leveraged above 5 km.

A platform or pod supported by the space elevator tower also has significant advantages over orbiting satellite platforms. Geographically fixed, but providing access to regions of space closer to the surface than geostationary orbit, elevator platforms provide the ideal means to communicate over a wide area and to conduct remote sensing and tourism activities. As a tourist destination, the elevator platforms provide stations located at fixed attitudes from the surface for observation. The elevator platforms provide the means to safely access a region of space with a view extending hundreds of kilometers.

The space elevator tower may also provide a near-surface observation platform with oversight over a fixed geographical area. Such platforms can be used for observation, remote sensing and communications. Small systems may be mobile and delivered to sites for temporary applications for example to provide temporary communications towers typically between 25 m and 150 m. The space elevator tower may also provide a platform for energy generation. Used with an elevator component equipment may be accessed and maintained during operation. Used without an elevator component, equipment may be installed only during the construction of the apparatus.

The invention provides a method of mounting elevator cars to the freestanding space elevator tower. The method allows for bi-directional travel of elevator cars as they grip to the sides of structure without use of a track.

Further aspects and advantages of the invention will appear from the following description taken together with the accompanying drawings.

BRIEF DESCRIPTION OF THE DRAWING

FIG. 1 is an isometric view showing an embodiment of an elevator car and also illustrating a method of gripping the core structure.

DETAILED DESCRIPTION OF THE DRAWING

Elevators with Devices that Grip the Side of a Cylindrical Core in a Spiral

Elevators with devices that grip the side of a cylindrical core in a spiral arrangement may allow cars to pass each other and enable bi-directional travel along the core. This configuration is illustrated in FIG. 1 where a spiral mounting arrangement that encompasses at least half the core circumference 991 grips a circular central core structure 992 and supports pressurised elevator cars 993 with airlocks 994 and observation windows 995. Locomotion is achieved, for example, using drive wheels 996 in frictional contact with the exterior of the core segment. In normal operation, the elevator rises or descends the tower (A). When two cars meet, they are able to pass each other by adjusting their motion as (B). In the absence of other car switching mechanisms, only unidirectional travel may be possible, and cars must shuttle payload between stations.

The invention claimed is:

1. A method of driving elevator cars comprising:
   providing a pneumatically pressurized elevator core structure, the core structure having a circumference;
   mounting a first and second elevator car to said circumference, each car having a spiral mounting arrangement that encompasses at least half of the circumference, the spiral mounting arrangement having a spiral shape and drive mechanisms;
   driving the first elevator car in a twisting motion to pass by the second elevator car while both the first and second cars are mounted to the circumference.

2. A method of driving elevator cars comprising:
   providing an elevator core structure, the core structure having a circumference;
   mounting a first and second elevator car to said circumference, each car having a spiral mounting arrangement that encompasses at least half of the circumference, the spiral mounting arrangement having a spiral shape and drive mechanisms;
   driving the first elevator car in a twisting motion to pass by the second elevator car while both the first and second cars are mounted to the circumference, wherein the drive mechanisms are in frictional contact with the circumference.

* * * * *